United States Patent
Woo et al.

(10) Patent No.: US 11,041,675 B2
(45) Date of Patent: Jun. 22, 2021

(54) ELECTRODE MOUNTING UNIT AND ELECTRODE DRYING DEVICE COMPRISING THE SAME

(71) Applicant: LG Chem, Ltd., Seoul (KR)

(72) Inventors: Sang Jin Woo, Daejeon (KR); Sin Young Park, Daejeon (KR); Tae Won Kang, Daejeon (KR); Dong Hyeuk Park, Daejeon (KR); Yoon Bong Wi, Daejeon (KR)

(73) Assignee: LG Chem, Ltd.

( * ) Notice: Subject to any disclaimer, the term of this patent is extended or adjusted under 35 U.S.C. 154(b) by 128 days.

(21) Appl. No.: 16/603,930

(22) PCT Filed: Dec. 24, 2018

(86) PCT No.: PCT/KR2018/016587
§ 371 (c)(1),
(2) Date: Oct. 9, 2019

(87) PCT Pub. No.: WO2019/146919
PCT Pub. Date: Aug. 1, 2019

(65) Prior Publication Data
US 2020/0124349 A1    Apr. 23, 2020

(30) Foreign Application Priority Data
Jan. 29, 2018 (KR) .......... 10-2018-0010690

(51) Int. Cl.
*F26B 19/00* (2006.01)
*F26B 25/14* (2006.01)
*H01M 4/04* (2006.01)

(52) U.S. Cl.
CPC ............... *F26B 25/14* (2013.01); *H01M 4/04* (2013.01)

(58) Field of Classification Search
CPC .......... F26B 25/14; H01M 4/04; Y02E 60/10; B65H 16/028; B65H 18/023; B65H 2403/72
(Continued)

(56) References Cited

U.S. PATENT DOCUMENTS

2005/0058889 A1    3/2005   Goishihara
2012/0167409 A1    7/2012   Fujiwara
(Continued)

FOREIGN PATENT DOCUMENTS

EP    0827222 A2    3/1998
JP    2002280078 A    9/2002
(Continued)

OTHER PUBLICATIONS

International Search Report for Application No. PCT/KR2018/016587, dated Apr. 3, 2019, pp. 1-2.
(Continued)

*Primary Examiner* — John P McCormack
(74) *Attorney, Agent, or Firm* — Lerner, David, Littenberg, Krumholz & Mentlik, LLP

(57) ABSTRACT

The present invention relates to an electrode mounting unit comprising: a mounting member comprising a horizontal plate, a vertical plate disposed on a top surface of the horizontal plate, and a shaft which is fixed to the vertical plate and into which an electrode roll is fitted to be mounted; and an unwinding prevention member disposed between the electrode wound around the electrode roll and the horizontal plate to support the electrode wound around the electrode roll so as to prevent the electrode wound around the electrode roll from being unwound.

10 Claims, 8 Drawing Sheets

(58) Field of Classification Search
USPC .... 34/201, 202; 242/331.5, 358.1, 358, 170,
242/171, 326, 326.1, 326.2, 326.3, 327,
242/590, 129.8, 139, 134, 595, 422.4,
242/422.5; 29/623.1
See application file for complete search history.

(56) References Cited

U.S. PATENT DOCUMENTS

| | | | |
|---|---|---|---|
| 2013/0288115 | A1* | 10/2013 | Nidelkoff .......... H01M 10/0587 |
| | | | 429/208 |
| 2014/0087225 | A1 | 3/2014 | Zhang et al. |
| 2018/0226700 | A1 | 8/2018 | Kim et al. |

FOREIGN PATENT DOCUMENTS

| | | |
|---|---|---|
| KR | 100153364 B1 | 11/1998 |
| KR | 200375048 Y1 | 2/2005 |
| KR | 20050016059 A | 2/2005 |
| KR | 20080108721 A | 12/2008 |
| KR | 20110084737 A | 7/2011 |
| KR | 20120040737 A | 4/2012 |
| KR | 20140015515 A | 2/2014 |
| KR | 101563353 B1 | 10/2015 |
| KR | 20160144265 A | 12/2016 |
| KR | 20170059273 A | 5/2017 |
| WO | 2017086592 A1 | 5/2017 |

OTHER PUBLICATIONS

Extended European Search Report with Written Opinion for Application No. 18902671.9 dated May 29, 2020, 8 pages.

* cited by examiner

2

ELECTRODE MOUNTING UNIT AND ELECTRODE DRYING DEVICE COMPRISING THE SAME

CROSS-REFERENCE TO RELATED APPLICATION

The present application claims the benefit of the priority of Korean Patent Application No. 10-2018-0010690, filed on Jan. 29, 2018, which is hereby incorporated by reference in its entirety.

TECHNICAL FIELD

The present invention relates to an electrode mounting unit and an electrode drying device comprising the same, and more particularly, to an electrode mounting unit, which is capable of preventing an electrode wound around an electrode roll from being unwound, and an electrode drying device comprising the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

The electrode is wound in a roll shape and then dried through an electrode drying device to remove a residual solvent and residual moisture. That is, the electrode drying device according to the related art dries the electrode wound in the roll shape by using hot air.

However, when the electrode is dried through the electrode drying device, the electrode wound in the roll shape may be easily unwound to be damaged, or process failure may occur by the unwound electrode.

DISCLOSURE OF THE INVENTION

Technical Problem

The present invention has been made to solve the above problems, an object of the present invention is to provide an electrode mounting unit, which comprises an unwinding prevention member for preventing an electrode wound in a roll shape from being unwound to stably mount and dry the electrode, thereby previously preventing process failure from occurring, and an electrode drying device comprising the same.

Technical Solution

To achieve the above object, an electrode mounting unit according to a first embodiment of the present invention comprises: a mounting member comprising a horizontal plate, a vertical plate disposed on a top surface of the horizontal plate, and a shaft which is fixed to the vertical plate and into which an electrode roll is fitted to be mounted; and an unwinding prevention member disposed between the electrode wound around the electrode roll and the horizontal plate to support the electrode wound around the electrode roll so as to prevent the electrode wound around the electrode roll from being unwound.

A top surface of the unwinding prevention member on which the electrode is supported may be formed as a curved surface having the same curvature radius as the electrode wound around the electrode roll.

A hook protrusion on which the electrode wound around the electrode roll is hooked and supported may be formed on one end of the curved surface.

One side surface of the unwinding prevention member may be formed as an inclined surface.

A handle part may be formed on the other side surface of the unwinding prevention member.

The unwinding prevention member may be made of a synthetic resin having elastic restoring force.

An electrode drying device according to a second embodiment of the present invention comprises: a mounting unit on which an electrode roll around which an electrode is wound is mounted; and a drying chamber accommodating the mounting unit to dry the electrode wound around the electrode roll, wherein the mounting unit comprises: a mounting member comprising a horizontal plate, a vertical plate disposed on a top surface of the horizontal plate, and a shaft which is fixed to the vertical plate and into which the electrode roll is fitted to be mounted; and an unwinding prevention member disposed between the electrode wound around the electrode roll and the horizontal plate to support the electrode wound around the electrode roll so as to prevent the electrode wound around the electrode roll from being unwound.

In an electrode mounting unit according to a third embodiment of the present invention, a bottom surface of an unwinding prevention member may be formed as a horizontal surface, wherein an unevenness for preventing sliding may be formed on the horizontal surface.

In an electrode mounting unit according to a fourth embodiment of the present invention, an unevenness is formed on a curved surface of an unwinding prevention member.

Advantageous Effects

First: The electrode mounting unit of the present invention may comprise the mounting member on which the electrode roll in which the electrode is wound in the roll shape is mounted and the unwinding prevention member supporting the electrode wound around the electrode roll mounted on the mounting member, thereby preventing the electrode wound around the electrode roll from being unwound.

Second: In the electrode mounting unit of the present invention, the top surface of the unwinding prevention member may have the curved surface having the same curvature radius as the electrode wound around the electrode roll. Thus, the adhesion force between the electrode and the unwinding prevention member may increase to stably support the electrode, thereby significantly preventing the electrode wound around the electrode roll from being unwound.

Third: The hook protrusion on which one side of the electrode wound around the electrode roll is hooked and supported may be formed on the curved surface of the unwinding prevention member of the prevent invention. Thus, the adhering position between the electrode wound around the electrode roll and the unwinding prevention member may be easily adjusted.

Fourth: One side surface of the unwinding prevention member may be formed as the inclined surface. Thus, the unwinding prevention member may be easily inserted between the electrode wound around the electrode roll and the mounting member. That is, in the case in which the space between the electrode wound around the electrode roll and the mounting member is less than the thickness of the unwinding prevention member, when the inclined surface is closely attached to the bottom surface of the mounting member to tilt the unwinding prevention member, the unwinding prevention member may be easily inserted between the electrode wound around the electrode roll and the mounting member.

Fifth: the handle part may be formed on the other side surface of the unwinding prevention member of the present invention. Thus, the unwinding prevention member may be easily inserted between the electrode wound around the electrode roll and the mounting member or be easily removed.

Sixth: the unevenness for preventing the unwinding prevention member from being slid may be formed on the bottom surface of the unwinding prevention member to prevent the unwinding preventing member from moving. Thus, the electrode wound around the electrode roll may be stably supported and prevented from being unwound.

Seventh: the unevenness may be formed on the curved surface of the unwinding prevention member. Thus, the electrode wound around the electrode roll and the unwinding prevention member may be supported in the multistage to significantly prevent the electrode from being unwound.

Eighth: the electrode drying device may comprise the electrode mounting unit and the drying chamber to stably mount and dry the electrode, thereby previously preventing the process failure from occurring.

MODE FOR CARRYING OUT THE INVENTION

Figure 1:
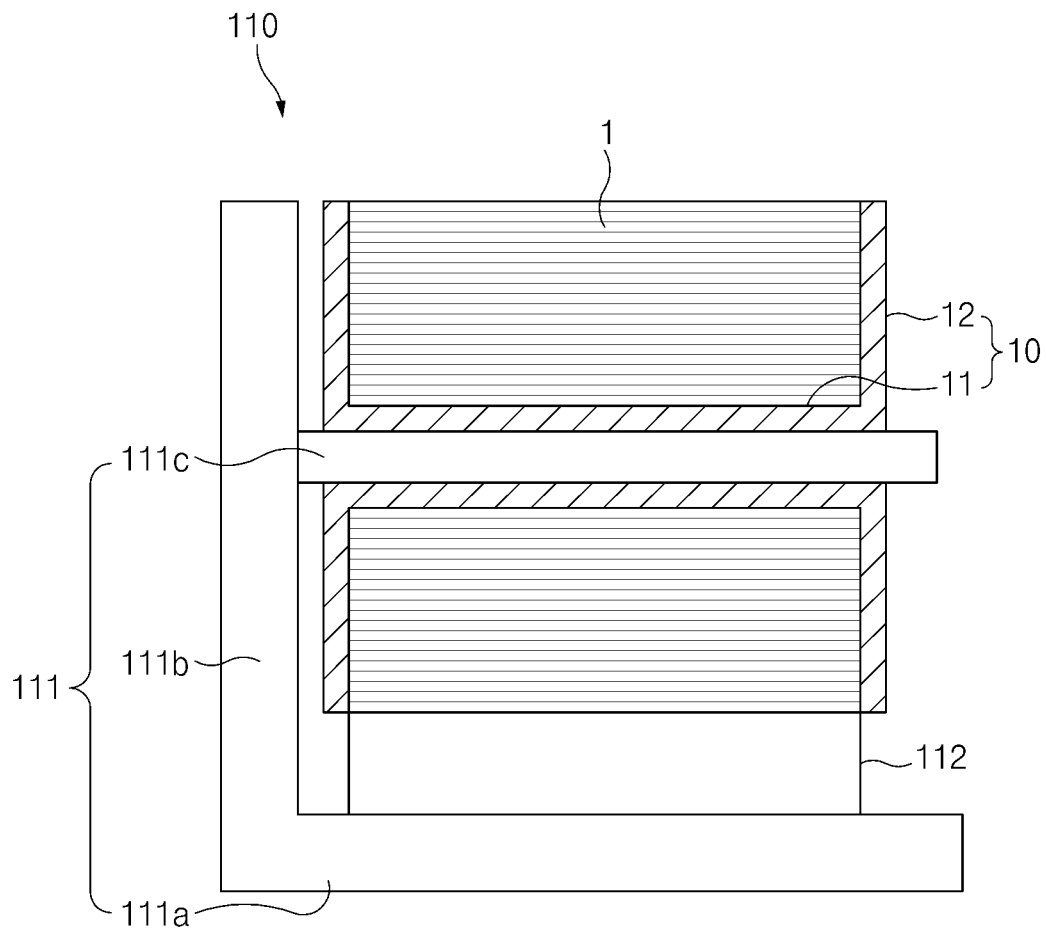
FIG. 1 is a side view of an electrode mounting unit according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Mounting Unit According to First Embodiment of the Present Invention]

As illustrated in FIG. 1, an electrode mounting unit 110 according to a first embodiment of the present invention comprises a mounting member 111 on which an electrode roll 10, around which an electrode 1 is wound, is mounted and an unwinding prevention member 112 supporting the electrode 1 to prevent the electrode 1 of the electrode roll 10 mounted on the mounting member 111 from being unwound.

The electrode roll 10 comprises a cylindrical winding part 11 around which the electrode 1 is wound and which has a mounting hole in a center thereof and plate-shaped support parts 12 respectively provided on both ends of the winding part 11 to support both side surfaces of the electrode wound around the winding part 11. The winding part 11 and the support parts 12 are integrated with each other.

The mounting member 111 comprises a horizontal plate 111a, a vertical plate 111b disposed on a top surface of the horizontal plate 111a, and a shaft 111c which is fixed to the vertical plate 111b and into which the electrode roll 10 is fitted to be mounted.

Here, the horizontal plate 111a and the vertical plate 111b may be connected to each other in a "⌊" shape. Thus, a space between the horizontal plate 111a and the vertical plate 111b may be effectively used.

Particularly, the horizontal plate 111a and the vertical plate 111b may be made of the same material. The horizontal plate 111a may have a thickness greater than that of the vertical plate 111b to prevent the vertical plate 111b from falling down through a weight of the horizontal plate 111a.

Also, the shaft 111c may have a structure that is adjustable in position on the vertical plate 111b in a direction toward or away from the horizontal plate 111a. Thus, an interval between the shaft 111c and the horizontal plate 111a may be adjusted, and thus, the electrode roll 10 having various sizes may be mounted.

Figure 2:
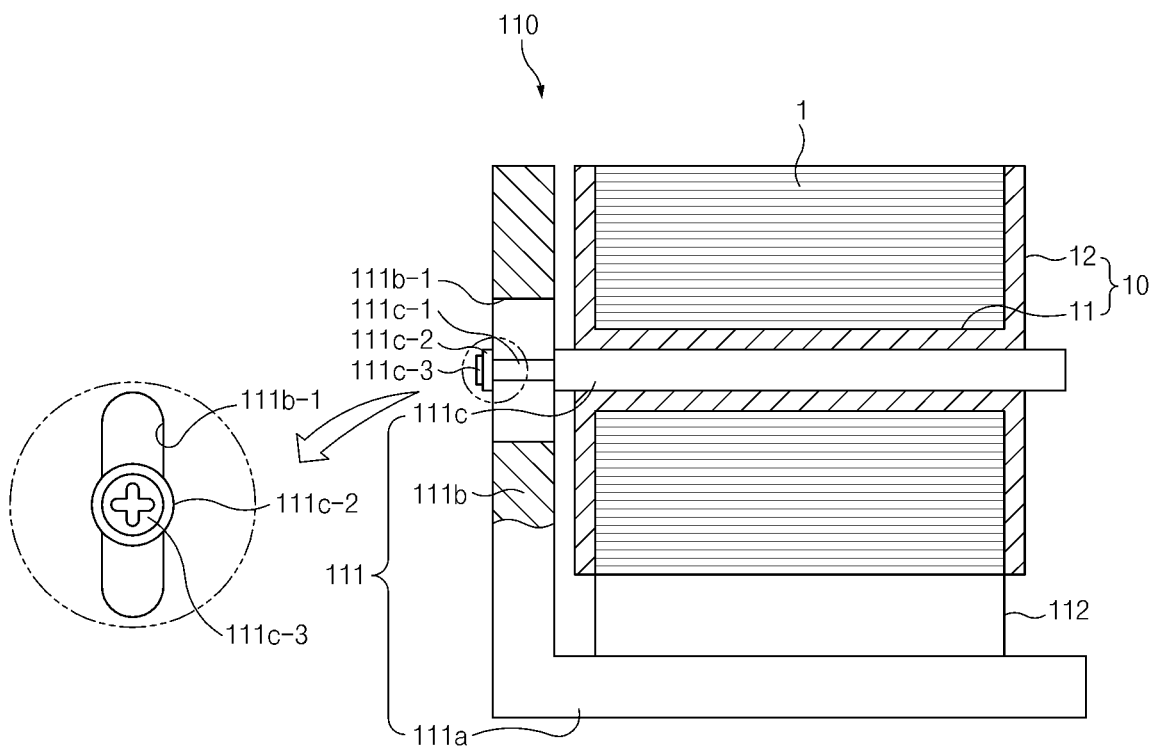
FIG. 2 is a side view illustrating another example of the electrode mounting unit according to the first embodiment of the present invention.

For example, as illustrated in FIG. 2, the shaft 111c comprises an insertion part 111c-1 inserted into one side of a long hole 111b-1 formed in the vertical plate 111b in the direction of the horizontal plate 111a and a bolt 111c-3 comprising a support piece 111c-2 disposed on the other side of the long hole 111b-1 and coupled to the insertion part 111c-1 to fix the shaft 111c.

That is, the bolt 111c-3 may be released or fastened to allow the shaft 111c to ascend or descend within the long hole 111b-1. Thus, the interval between the shaft 111c and the horizontal plate 111a may be easily adjusted.

The mounting member 111 having the above-described configuration may comprise the horizontal plate 111a, the vertical plate 111b, and the shaft 111c to easily mount the electrode roll 10 around which the electrode 1 is wound.

Figure 3:
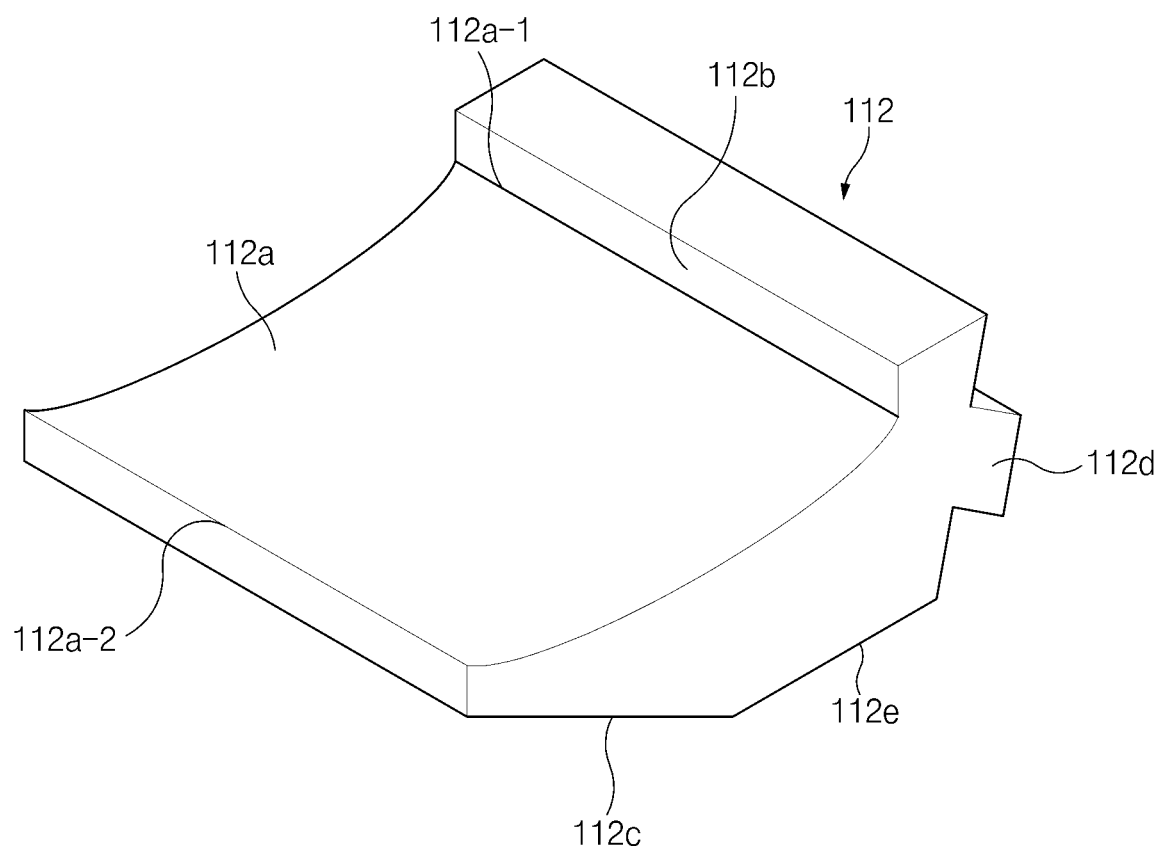
FIG. 3 is a perspective view illustrating an unwinding prevention member of the electrode mounting unit according to the first embodiment of the present invention.
Figure 4:
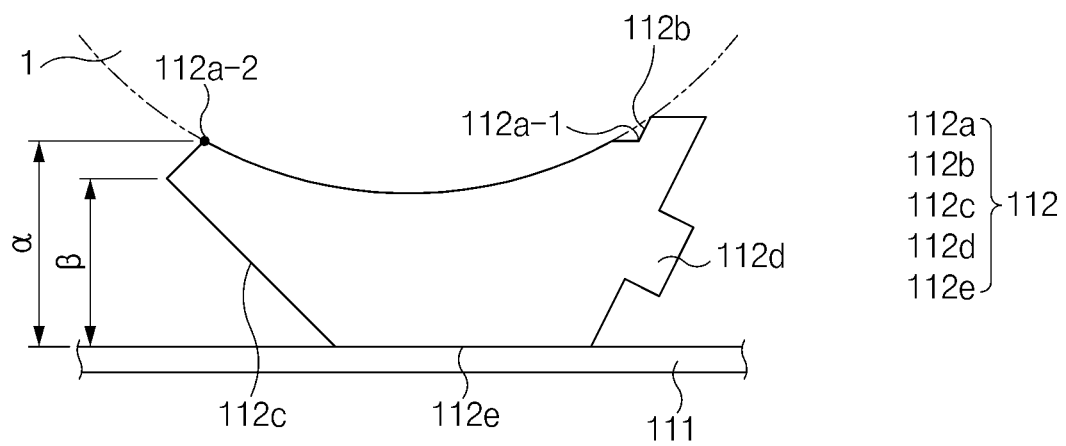
FIG. 4 is a front view of the electrode mounting unit according to the first embodiment of the present invention.

As illustrated in FIGS. 3 and 4, the unwinding prevention member 112 is mounted on the mounting member to prevent the electrode wound around the electrode roll from being unwound. The unwinding prevention member 112 is inserted between the electrode 1 wound around the electrode roll 10 and the horizontal plate 111a to support the electrode 1 wound around the electrode roll 10, thereby preventing the electrode 1 wound around the electrode roll 10 from being unwound.

That is, the electrode 1 wound around the electrode roll 10 may be unwound by restoring force. Here, the unwinding prevention member 112 may be press-fitted between the electrode 1 wound around the electrode roll 10 and the horizontal plate 111a to press and support the electrode 1 wound around the electrode roll 10, thereby preventing the electrode 1 wound around the electrode roll 10 from being unwound.

Particularly, a top surface of the unwinding prevention member 112 on which the electrode 1 wound around the electrode roll 10 is supported is formed as a curved surface 112a having the same curvature radius as the electrode 1 wound around the electrode roll 10. That is, the top surface of the unwinding prevention member 112 may be formed as the curved surface 112a to increase in adhesion area between the electrode 1 and the curved surface 112a, thereby significantly preventing the electrode 1 wound around the electrode roll 10 from being unwound.

A hook protrusion 112b is formed on one end 112a-1 of the curved surface 112a so that the electrode wound around the electrode roll 10 is hooked and supported, thereby preventing the electrode 1 wound around the electrode roll 10 from being separated through the one end 112a-1 of the curved surface 112a, and particularly, easily adjusting the adhesion portion between the electrode 1 wound around the electrode roll 10 and the unwinding prevention member 112.

Figure 5:
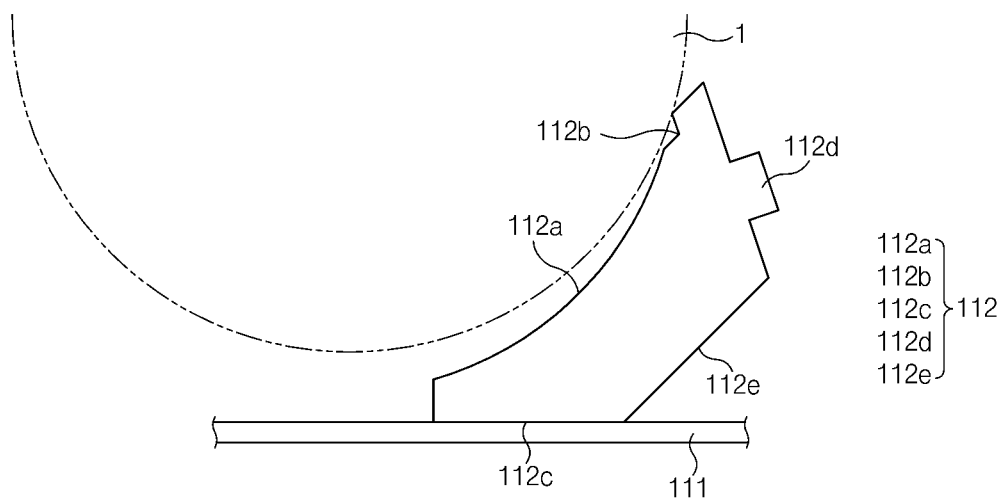
FIG. 5 is a front view illustrating a state in which the unwinding prevention member of the electrode mounting unit is tilted according to the first embodiment of the present invention.

One side surface of the unwinding prevention member 112 may be formed as an inclined surface 112c, and the unwinding prevention member 112 may be easily inserted between the electrode 1 wound around the electrode roll 10 and the mounting member 111 through the inclined surface 112c. That is, as illustrated in FIG. 5, when the inclined surface of the unwinding prevention member 112 is closely attached to the mounting member 111, the unwinding prevention member 112 may be easily inserted between the electrode 1 wound around the electrode roll 10 and the mounting member 111.

As illustrated in FIG. 4, in the curved surface 112a, the other end 112a-2, on which the inclined surface 112c is disposed, may be higher than the other end 112a-1, on which the hook protrusion 112b is disposed, in the direction of the electrode 1. That is, since the hook protrusion 112b is formed, the one end 112a-1 of the curved surface 112a may stably support the electrode 1. However, since the other end 112a-2 of the curved surface 112a does not have the structure that supports the electrode 1, the other end 112a-2 may be formed higher than the one end 112a-1 to prevent the electrode 1 supported on the curved surface 112a from being separated in a direction of the other end 112a-2.

In more detail, referring to FIG. 4, a height α from the top surface of the horizontal plate 111 to the other end 112a-2 of the curved surface 112a may be greater than that β from the top surface of the horizontal plate 111 to the one end 112a-1 of the curved surface 112a.

A handle part 112d is formed on the other side surface of the unwinding prevention member 112. The unwinding prevention member 112 may be tilted through the handle part 112d or may be easily inserted or discharged between the electrode 1 wound around the electrode roll 10 and the mounting member 111 through the handle part 112d. Also, the handle part 112d may be integrated with the unwinding prevention member 112 when the unwinding prevention member 112 is formed to improve ease of the manufacture.

Particularly, the other side surface of the unwinding prevention member 112 is formed as an inclined surface corresponding to the inclined surface 112c formed on the one side surface of the unwinding prevention member 112, and the handle part 112d is formed on the inclined surface. That is, both side surfaces of the unwinding prevention member 112 may be formed as inclined surfaces having an approximately "V" shape. Thus, the curved surface 112a formed on the top surface of the unwinding prevention member 112 may be significantly expanded in surface area to more stably support the electrode 1 wound around the electrode roll 10.

The unwinding prevention member 112 is made of a synthetic resin having elastic restoring force. Particularly, the unwinding prevention member 112 may be made of Viton to elastically support the electrode 1 wound around the electrode roll 10, thereby preventing the electrode 1 from being damaged. The Viton may be fluorine rubber and have superior heat resistance, oil resistance, and chemical resistance to significantly prevent the electrode 1 from being damaged.

Thus, the electrode mounting unit 110 having the above-described configuration according to the first embodiment may comprise the mounting member 111 and the unwinding prevention member 112 to stably mount the electrode roll 10 around which the electrode 1 is wound and effectively prevent the electrode 1 wound around the electrode roll 10 from being wound.

Hereinafter, in descriptions of another embodiment of the present invention, constituents having the same configuration and function as the abovementioned embodiment have been given the same reference numeral in the drawings, and thus duplicated description will be omitted.

[Electrode Drying Device According to Second Embodiment of the Present Invention]

Figure 6:
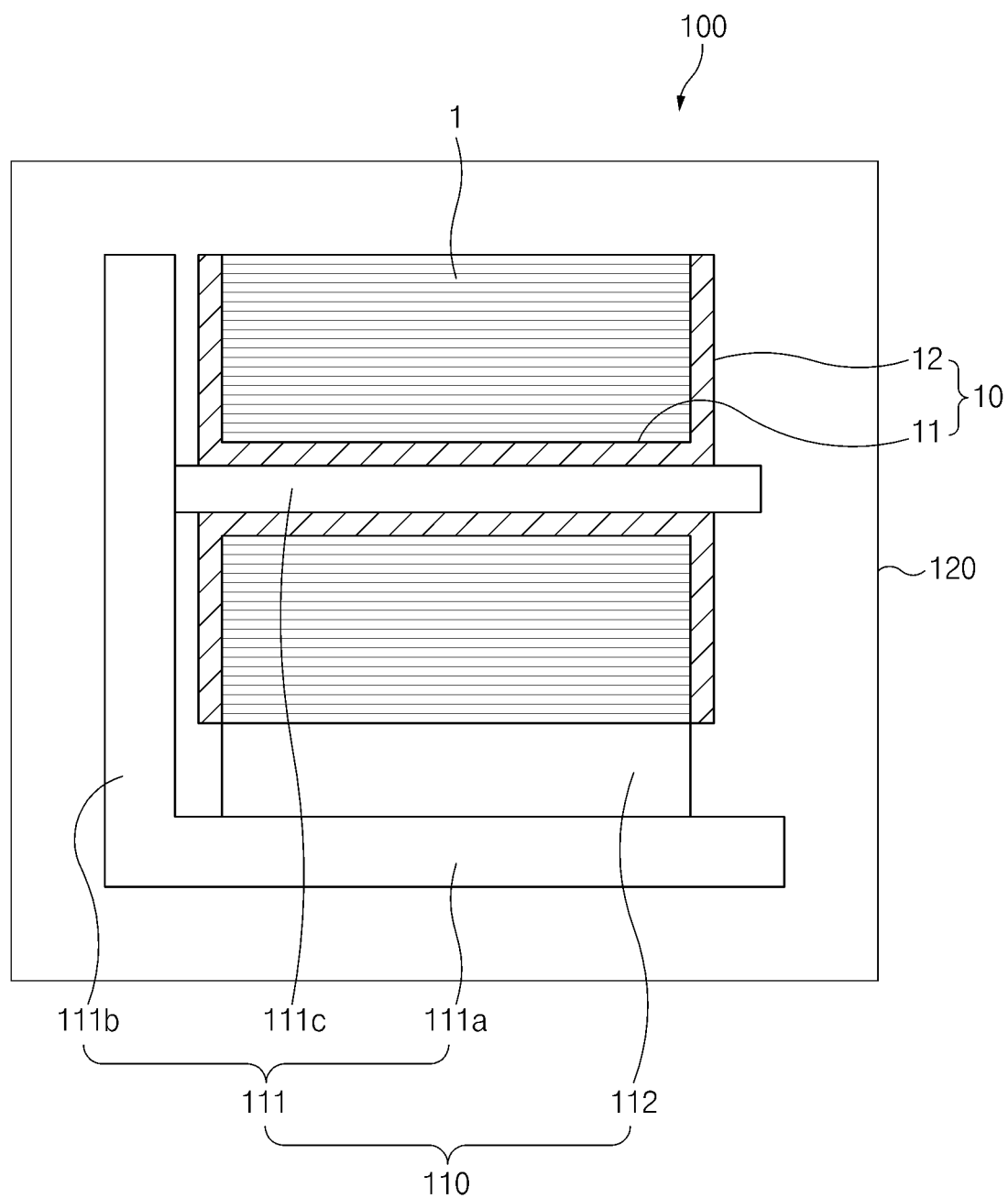
FIG. 6 is a side view of an electrode drying device according to a second embodiment of the present invention.

As illustrated in FIG. 6, an electrode drying device 100 according to a second embodiment of the present invention is configured to dry an electrode wound around an electrode roll and comprises a mounting unit 110 on which the electrode roll 10 around which the electrode 1 is wound is mounted and a drying chamber 120 accommodating the mounting unit 110 to dry the electrode 1 wound around the electrode roll 10.

The mounting unit 110 comprises a horizontal plate 111, a vertical plate 112 disposed on a top surface of the horizontal plate 111, and a shaft 113 which is fixed to the vertical plate 112 and into which the electrode roll 10 is fitted to be mounted.

Here, the mounting unit 110 has the same configuration and function as the electrode mounting unit 110 according to the foregoing first embodiment of the present invention, and thus, its detailed description will be omitted.

The drying chamber 120 has an accommodation space in which the mounting unit 110 is accommodated, and hot air or heat is applied to the electrode roll 10 mounted on the mounting unit 110 to dry the electrode 1 wound around the electrode roll 10.

Here, the electrode 1 wound around the electrode roll 10 is supported by an unwinding prevention member of the mounting unit 110 to prevent the electrode 1 wound around the electrode roll 10 from being unwound even though the hot air is directly applied to the electrode 1.

Thus, the electrode drying device 100 according to the second embodiment of the present invention may prevent the electrode 1 wound around the electrode roll 10 and stably dry the electrode 1 wound around the electrode roll 10.

[Electrode Mounting Unit According to Third Embodiment of the Present Invention]

Figure 7:
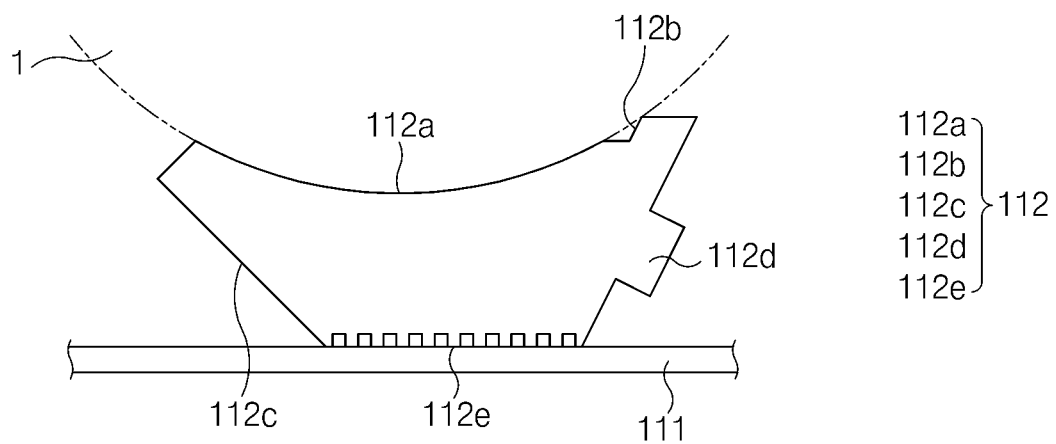
FIG. 7 is a front view of an electrode drying device according to a third embodiment of the present invention.

In an electrode mounting unit according to a third embodiment of the present invention, as illustrated in FIG. 7, a bottom surface of an unwinding prevention member 112 supported on a horizontal plate 111 may be provided as a horizontal surface 112e to stably seat the unwinding prevention member 112 on the horizontal plate 111.

Particularly, an unevenness for preventing sliding may be formed on the horizontal surface 112e to prevent the unwinding prevention member 112 from moving on the horizontal plate 111. Therefore, the unwinding prevention member 112 may stably support the electrode 1 wound around the electrode roll 10 to prevent the electrode 1 from being unwound.

[Electrode Mounting Unit According to Fourth Embodiment of the Present Invention]

Figure 8:
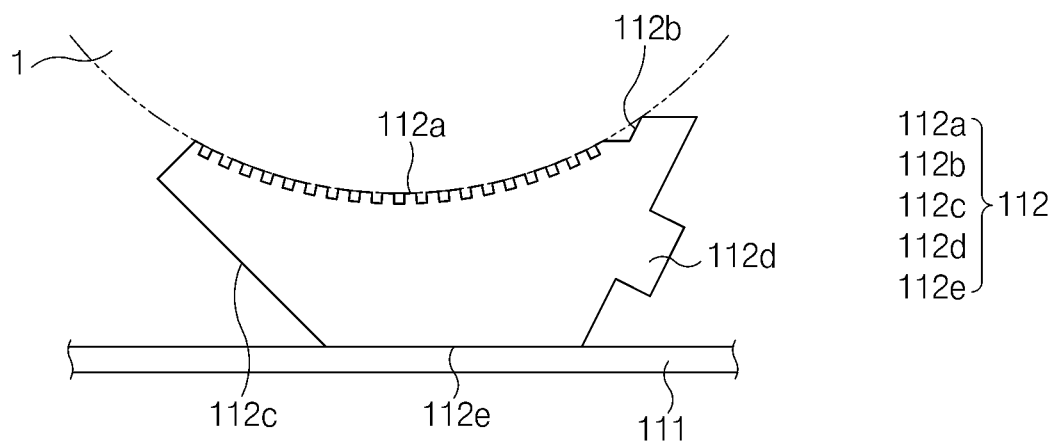
FIG. 8 is a front view of an electrode drying device according to a fourth embodiment of the present invention.

In an electrode mounting unit 110 according to a fourth embodiment of the present invention, as illustrated in FIG. 8, an unevenness may be formed on a curved surface 112a of an unwinding prevention member 112 so that an electrode 1 wound around an electrode roll 10 and the curved surface 112a of the unwinding prevention member 112 may be supported in multistage to significantly prevent the electrode 1 from being unwound, and particularly, to prevent the electrode 1 wound around the electrode roll 10 and supported on the curved surface 112a from slidably moving. Particularly, the unevenness may be formed on the curved surface 112a to form a passage between the electrode 1 and the curved surface 112a, thereby stably drying the electrode 1 disposed on the curved surface 112a.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode mounting unit comprising:
   a mounting member comprising a horizontal plate, a vertical plate disposed on a top surface of the horizontal plate, and a shaft which is fixed to the vertical plate and into which an electrode roll is fitted to be mounted; and
   an unwinding prevention member disposed between an electrode wound around the electrode roll and the horizontal plate to support the electrode wound around the electrode roll so as to prevent the electrode wound around the electrode roll from being unwound.

2. The electrode mounting unit of claim 1, wherein a top surface of the unwinding prevention member on which the electrode is supported is formed as a curved surface having the same curvature radius as the electrode wound around the electrode roll.

3. The electrode mounting unit of claim 2, wherein a hook protrusion on which the electrode wound around the electrode roll is hooked and supported is formed on one end of the curved surface.

4. The electrode mounting unit of claim 1, wherein one side surface of the unwinding prevention member is formed as an inclined surface.

5. The electrode mounting unit of claim 4, wherein a handle part is formed on the other side surface of the unwinding prevention member.

6. The electrode mounting unit of claim 1, wherein a bottom surface of the unwinding prevention member is formed as a horizontal surface,
   wherein an unevenness for preventing sliding is formed on the horizontal surface.

7. The electrode mounting unit of claim 1, wherein the unwinding prevention member is made of a synthetic resin having elastic restoring force.

8. The electrode mounting unit of claim 2, wherein an unevenness is formed on the curved surface.

9. An electrode drying device comprising:
   a mounting unit on which an electrode roll around which an electrode is wound is mounted; and
   a drying chamber accommodating the mounting unit to dry the electrode wound around the electrode roll,
   wherein the mounting unit comprises:
   a mounting member comprising a horizontal plate, a vertical plate disposed on a top surface of the horizontal plate, and a shaft which is fixed to the vertical plate and into which the electrode roll is fitted to be mounted; and
   an unwinding prevention member disposed between the electrode wound around the electrode roll and the horizontal plate to support the electrode wound around the electrode roll so as to prevent the electrode wound around the electrode roll from being unwound.

10. The electrode drying device of claim 9, wherein a top surface of the unwinding prevention member on which the electrode is supported is formed as a curved surface having the same curvature radius as the electrode wound around the electrode roll.

* * * * *